United States Patent [19]
Seem et al.

[11] Patent Number: 5,682,329
[45] Date of Patent: Oct. 28, 1997

[54] ON-LINE MONITORING OF CONTROLLERS IN AN ENVIRONMENT CONTROL NETWORK

[75] Inventors: John Seem, Shorewood; Howard A. Jensen, Mequon; Richard H. Monroe, West Milwaukee, all of Wis.

[73] Assignee: Johnson Service Company, Milwaukee, Wis.

[21] Appl. No.: 360,217

[22] Filed: Dec. 20, 1994

Related U.S. Application Data

[63] Continuation-in-part of Ser. No. 278,915, Jul. 22, 1994.

[51] Int. Cl.⁶ ............................................. G01F 1/06
[52] U.S. Cl. .................. 364/551.01; 364/510; 364/581; 236/49.5; 62/93; 62/126; 165/16
[58] Field of Search ........................ 340/679; 364/184, 364/508, 581, 582, 575, 510, 551.01; 236/49.5, 45, 25 R; 62/93, 126, 129, 16; 105/16

[56] References Cited

U.S. PATENT DOCUMENTS

| | | | |
|---|---|---|---|
| 4,549,601 | 10/1985 | Wellman et al. | 165/2 OR |
| 4,630,670 | 12/1986 | Wellman et al. | 165/16 OR |
| 5,058,388 | 10/1991 | Shaw et al. | 62/179 X |
| 5,071,065 | 12/1991 | Aalto et al. | 364/505 X |
| 5,311,451 | 5/1994 | Barrett | 364/550 |
| 5,355,305 | 10/1994 | Seem et al. | 364/157 X |
| 5,446,677 | 8/1995 | Jensen et al. | 364/510 |

OTHER PUBLICATIONS

Spoerre; Juliek., "Machine Performance monitoring and fault classification using an Expontially Weighted Moving Aveg. Scheme, Thesis", May 1993.

*Primary Examiner*—Emanuel T. Voeltz
*Assistant Examiner*—Kamini Shah
*Attorney, Agent, or Firm*—Harness, Dickey & Pierce, P.L.C.

[57] ABSTRACT

The present invention relates to a diagnostic system for use in a network control system. The diagnostic system is preferably utilized to analyze HVAC system or VAV box performance in an environmental control system such as a network facilities management system. The diagnostic system advantageously records temperature, air flow, and actuator position data in the controller associated with the VAV box and calculates an exponentially weighted moving average value. The exponentially weighted moving average value may be related to error values, process output values, change in actuator position, actuator position, duty cycle of the actuator, or starts, stops and reversals of the actuator. Such a system allows a person to analyze VAV boxes and controller performance over a particular timely period and the lifetime of the system. Box and damper warnings may be provided by the diagnostic system when the EWMA values are over or under particular threshold values. The EWMA values are advantageously calculated and stored in the individual controllers.

20 Claims, 19 Drawing Sheets

```
/***********************************************************************
/*
/* SINGLE DUCT DIAGNOSTIC SUPPORTED IN HVACPRO 4.00, 5.00 & 5.10, 9/28/94
/*
/***********************************************************************
SYMBOL VAV_1_INDEPENDENT_DIAG_DUTYCYCLE [ ] = {
    "ADD TYPE           ",   MODULE,   DON'T_CARE,
    "FLOAT 1.5/3600     ",   FCONST,   0.000416667,   /* IN HOURS */
    "CONTROLLER RUN TIME",   FLOAT,    RESULT,
    "CONTROLLER RUN TIME",   FLOAT,    RESULT,        /* SECONDS */

"OR TYPE            ",   MODULE,   DON'T_CARE,
    "DAMPER OPEN        ",   BINARY,   OUTPUT,
    "DAMPER CLOSE       ",   BINARY,   OUTPUT,
    "ON                 ",   BINARY,   RESULT,

"MUX TYPE           ",   MODULE,   DON'T_CARE,
    "FLOAT 1.5/3600     ",   FCONST,   0.000416667,   /* IN HOURS */
    "ZERO               ",   FCONST,   0.00,
    "ON                 ",   FLOAT,    RESULT,
    "TICKS              ",   FLOAT,    RESULT,

"ADD TYPE           ",   MODULE,   DON'T_CARE,
    "TICKS              ",   FLOAT,    RESULT,
    "ACTUATOR RUN TIME  ",   FLOAT,    RESULT,
    "ACTUATOR RUN TIME  ",   FLOAT,    RESULT
};
```

Fig-11A

```
/*****************************************************************
/*
/* SINGLE DUCT DIAGNOSTIC SUPPORTED IN HVACPRO 5.10,  9/28/94
/*
/*****************************************************************
SYMBOL MOVING_AVG_SD_FLOW_ERROR []    ={
        "SUBTRACT TYPE          ",      MODULE,     DON'T_CARE,
        "SUPPLY FLOW            ",      FLOAT,      RESULT,
        "SUPPLY SETPT           ",      FLOAT,      PARAM,       /* SETPOINT
        "CFM DIFF               ",      FLOAT,      RESULT,

"ABS VALUE TYPE         ",      MODULE,     DON'T_CARE,
        "CFM DIFF               ",      FLOAT,      RESULT,
        "CFM DIFF 1             ",      FLOAT,      RESULT

"SUBTRACT TYPE          ",      MODULE,     DON'T_CARE,
        "CFM DIFF 1             ",      FLOAT,      RESULT,
        "MOVING AVG FLOW ERROR  ",      FLOAT,      RESULT,
        "CFM DIFF 2             ",      FLOAT,      RESULT

"DIVIDE TYPE            ",      MODULE,     DON-T_CARE,
        "CFM DIFF 2             ",      FLOAT,      RESULT
        "FLOW FILTER VALUE      ",      FLOAT,      PARAM,
        "CFM DIFF 3             ",      FLOAT,      RESULT

/* FAILSOFT SUPPLY DELTA P, CATCH SENSOR FAILURE, STOP DIAGNOSTICS
        "FAILSOFT TYPE          ",      MODULE,     DON'T_CARE,
        "SUPPLY DELTA P         ",      FLOAT,      INPUT,
        "CFM DIFF 3             ",      FLOAT,      RESULT
        "ZERO                   ",      FCONST,     0,0,         /* FAILSOFT INPUT  */
        "CFM DIFF 3             ",      FLOAT,      RESULT

"IF SKIP TYPE           ",      MODULE,     DON'T_CARE,
        "BYTE SKIP DIAG         ",      BINARY,     RESULT,      /* NOT (OCC. OR STANDBY)

"ADD TYPE               ",      MODULE,     DON'T_CARE,
        "MOVING AVG FLOW ERROR  ",      FLOAT,      RESULT,
        "CFM DIFF 3             ",      FLOAT,      RESULT,
        "MOVING AVG FLOW ERROR  ",      FLOAT,      RESULT,
        };
```

Fig-11B

```
/***************************************************************************
/*
/* SINGLE DUCT DIAGNOSTIC SUPPORTED IN HVACPRO 5.10, 9/28/94
/*
/***************************************************************************
SYMBOL MOVING_AVG_ZONE_TEMP ERROR [ ]  = {
    "MUX TYPE              ",   MODULE,   DON'T_CARE,
    "ACTUAL HTG SETPT      ",   FLOAT,    RESULT,      /* HEATING SETPOINT   */
    "ACTUAL CLG SETPT      ",   FLOAT,    RESULT,      /* COOLING SETPOINT   */
    "HEAT MODE             ",   BINARY,   RESULT,      /* INTO HEATING SIDE
    "SETPT                 ",   FLOAT,    RESULT,

/* USE FAILSOFT ZONE TEMP, SINCE DIAGNOSTIC WILL STOP IN FAILSOFT TO FOLLOW
    "SUBTRACT TYPE         ",   MODULE,   DON'T_CARE,
    "FSOFT ZONE TEMP       ",   FLOAT,    RESULT,
    "SETPT                 ",   FLOAT,    RESULT,
    "OUTPUT DIFF           ",   FLOAT,    RESULT,

"ABS VALUE TYPE        ",   MODULE,   DON'T_CARE,
    "OUTPUT DIFF           ",   FLOAT,    RESULT,
    "OUTPUT DIFF ZT        ",   FLOAT,    RESULT,

"SUBTRACT TYPE         ",   MODULE,   DON'T_CARE,
    "OUTPUT DIFF ZT        ",   FLOAT,    RESULT,
    "MOVING AVG ZONE TEMP ERR ", FLOAT,   RESULT,
    "OUTPUT DIFF ZT 1      ",   FLOAT,    RESULT

"DIVIDE TYPE           ",   MODULE,   DON'T_CARE,
    "OUTPUT DIFF ZT 1      ",   FLOAT,    RESULT
    " ZONE TEMP FILTER VALUE",  FLOAT,    PARAM,
    "OUPUT DIFF ZT 2       ",   FLOAT,    RESULT

/* FAILSOFT ZONE TEMPERATURE, SENSOR FAILURE, STOP DIAGNOSTICS
    "FAILSOFT TYPE         ",   MODULE,   DON'T_CARE,
    "ZONE TEMP             ",   FLOAT,    INPUT,
    "OUTPUT DIFF ZT 2      ",   FLOAT,    RESULT
    "ZERO                  ",   FCONST,   0.0,         /* FAILSOFT INPUT   */
    "OUPUT DIFF ZT 2       ",   FLOAT,    RESULT

"IF SKIP TYPE          ",   MODULE,   DON'T_CARE,
    "BYTE SKIP DIAG        ",   BINARY,   RESULT,      /* NOT (OCC. OR STAND

"ADD TYPE              ",   MODULE,   DON'T_CARE,
    "MOVING AVG ZONE TEMP ERR ", FLOAT,   RESULT,
    "OUTPUT DIFF ZT 2      ",   FLOAT,    RESULT
    "MOVING AVG ZONE TEMP ERR ", FLOAT,   RESULT,
};
```

Fig-11C

```
/****************************************************************
/*
/* DUAL DUCT DIAGNOSTIC SUPPORTED IN HVACPRO 4.00, 5.00 & 5.10, 9/28/94
/*
/****************************************************************
SYMBOL VAV_DIAG_RUN_TIME [ ] = {
    "ADD TYPE            ",   MODULE,   DON'T_CARE,
    "FLOAT 1.5/3600      ",   FCONST,   0.000416667,   /* IN HOURS */
    "CONTROLLER RUN TIME,",   FLOAT,    RESULT,
    "CONTROLLER RUN TIME,",   FLOAT,    RESULT,

"OR TYPE             ",   MODULE,   DON'T_CARE,
    "COLD Dk OPEN        ",   BINARY,   OUTPUT,
    "COLD Dk CLOSE       ",   BINARY,   OUTPUT,
    "MOTOR ON            ",   BINARY,   RESULT,

"MUX TYPE            ",   MODULE,   DON'T_CARE,
    "FLOAT 1.5/3600      ",   FCONST,   0.000416667,   /* IN HOURS */
    "ZERO                ",   FCONST,   0.00,
    "MOTOR ON            ",   BINARY,   RESULT,
    "TICKS               ",   FLOAT,    RESULT,

"ADD TYPE            ",   MODULE,   DON'T_CARE,
    "TICKS               ",   FLOAT,    RESULT,
    "COLD Dk RUN TIME    ",   FLOAT,    RESULT,
    "COLD Dk RUN TIME    ",   FLOAT,    RESULT,

"OR TYPE             ",   MODULE,   DON'T_CARE,
    "HOT Dk OPEN         ",   BINARY,   OUTPUT,
    "HOT Dk CLOSE        ",   BINARY,   OUTPUT,
    "MOTOR ON            ",   BINARY,   RESULT,

"MUX TYPE            ",   MODULE,   DON'T_CARE,
    "FLOAT 1.5/3600      ",   FCONST,   0.000416667,   /* IN HOURS */
    "ZERO                ",   FCONST,   0.00,
    "MOTOR ON            ",   BINARY,   RESULT,
    "TICKS               ",   FLOAT,    RESULT,

"ADD TYPE            ",   MODULE,   DON'T_CARE,
    "TICKS               ",   FLOAT,    RESULT,
    "HOT Dk RUN TIME     ",   FLOAT,    RESULT,
    "HOT Dk RUN TIME     ",   FLOAT,    RESULT,
};
```

Fig-11D

```
/****************************************************************
/*
/* DUAL DUCT DIAGNOSTIC SUPPORTED IN HVACPRO 5.10, 9/28/94
/*
/****************************************************************
SYMBOL MOVING_AVG_CDHD_FLOW_ERROR [ ]  = {
        "SUBTRACT TYPE              ",   MODULE,    DON'T_CARE,
        "COLD Dk FLOW               ",   FLOAT,     RESULT,
        "COLD Dk SETPT              ",   FLOAT,     PARAM,    /* SETPOINT
        "FLOW DIFF                  ",   FLOAT,     RESULT,

"ABS VALUE TYPE             ",   MODULE,    DON'T_CARE,
        "FLOW DIFF                  ",   FLOAT,     RESULT,
        "FLOW DIFF 1                ",   FLOAT,     RESULT

"SUBTRACT TYPE              ",   MODULE,    DON'T_CARE,
        "FLOW DIFF 1                ",   FLOAT,     RESULT,
        "MOVING AVG CD FLOW ERROR   ",   FLOAT,     RESULT,
        "FLOW DIFF 2                ",   FLOAT,     RESULT

"DIVIDE TYPE                ",   MODULE,    DON'T_CARE,
        "FLOW DIFF 2                ",   FLOAT,     RESULT
        "CD FILTER VALUE            ",   FLOAT,     PARAM.
        "FLOW DIFF 3                ",   FLOAT,     RESULT

"IF SKIP TYPE               ",   MODULE,    DON'T_CARE,
        "BYTE SKIP DIAG             ",   BINARY,    RESULT, /* NOT (OCC. OR. STANDBY) OR SHUTDOWN

"ADD TYPE                   ",   MODULE,    DON'T_CARE,
        "MOVING AVG CD FLOW ERROR   ",   FLOAT,     RESULT,
        "FLOW DIFF 3                ",   FLOAT,     RESULT,
        "MOVING AVG CD FLOW ERROR   ",   FLOAT,     RESULT,

"SUBTRACT TYPE              ",   MODULE,    DON'T_CARE,
        "HOT Dk FLOW                ",   FLOAT,     RESULT,
        "HOT Dk SETPT               ",   FLOAT,     PARAM,  /* SETPOINT
        "FLOW DIFF 4                ",   FLOAT,     RESULT,

"ABS VALUE TYPE             ",   MODULE,    DON'T_CARE,
        "FLOW DIFF 4                ",   FLOAT,     RESULT,
        "FLOW DIFF 5                ",   FLOAT,     RESULT

"SUBTRACT TYPE              ",   MODULE,    DON'T_CARE,
        "FLOW DIFF 5                ",   FLOAT,     RESULT,
        "MOVING AVG HD FLOW ERROR   ",   FLOAT,     RESULT,
        "FLOW DIFF 6                ",   FLOAT,     RESULT

"DIVIDE TYPE                ",   MODULE,    DON'T_CARE,
        "FLOW DIFF 6                ",   FLOAT,     RESULT,
        "HD FILTER VALUE            ",   FLOAT,     PARAM,
        "FLOW DIFF 7                ",   FLOAT,     RESULT
```

Fig-11E

```
"IF SKIP TYPE            ",  MODULE,    DON'T_CARE,
"BYTE SKIP DIAG          ",  BINARY,    RESULT,           /* NOT (OCC. OR STANDBY) OR SHUTDOWN

"ADD TYPE                ",             MODULE,    DON'T_CARE,
"MOVING AVG HD FLOW ERROR",             FLOAT,     RESULT,
"FLOW DIF F 7            ",             FLOAT,     RESULT
"MOVING AVG HD FLOW ERROR",             FLOAT,     RESULT,
};

/****************************************************************
/*
/*  DUAL DUCT DIAGNOSTIC SUPPORTED IN HVACPRO 5.10, 8K CONTROLLERS, 10/4/94
/*
/****************************************************************

SYMBOL MOVING_AVG _ CDHD_FLOW_ERROR_REVD [] = {
    "SUBTRACT TYPE           ",  MODULE,    DON'T_CARE,
    "COLD Dk FLOW            ",  FLOAT,     RESULT,
    "COLD Dk SETPT           ",  FLOAT,     PARAM,         /* SETPOINT
    "FLOW DIFF               ",  FLOAT,     RESULT,

"ABS VALUE TYPE          ",  MODULE,    DON'T_CARE,
    "FLOW DIFF               ",  FLOAT,     RESULT,
    "FLOW DIFF 1             ",  FLOAT,     RESULT

"SUBTRACT TYPE           ",  MODULE,    DON'T_CARE,
    "FLOW DIFF 1             ",  FLOAT,     RESULT,
    "MOVING AVG CD FLOW ERROR",  FLOAT,     RESULT,
    "FLOW DIFF 2             ",  FLOAT,     RESULT

"DIVIDE TYPE             ",  MODULE,    DON'T_CARE,
    "FLOW DIFF 2             ",  FLOAT,     RESULT
    "CD FILTER VALUE         ",  FLOAT,     PARAM,
    "FLOW DIFF 3             ",  FLOAT,     RESULT

/* FAILSOFT COLD Dk DELTA P, CATCH SENSOR FAILURE, STOP DIAGNOSTICS
    "FAILSOFT TYPE           ",  MODULE,    DON'T_CARE,
    "COLD Dk DELTA P         ",  FLOAT,     INPUT,
    "FLOW DIFF 3             ",  FLOAT,     RESULT
    "ZERO                    ",  FCONST,    0.0,           /* FAILSOFT INPUT */
    "FLOW DIFF 3             ",  FLOAT,     RESULT

"IF SKIP TYPE            ",  MODULE,    DON'T_CARE,
    "BYTE SKIP DIAG          ",  BINARY,    RESULT,        /* NOT ( OCC. OR STANDBY) OR SHUTDOWN

"ADD TYPE                ",  MODULE,    DON'T_CARE,
    "MOVING AVG CD FLOW ERROR",  FLOAT,     RESULT,
    "FLOW DIFF 3             ",  FLOAT,     RESULT
    "MOVING AVG CD FLOW ERROR",  FLOAT,     RESULT,

"SUBTRACT TYPE           ",  MODULE,    DON'T_CARE,
    "HOT Dk FLOW             ",  FLOAT,     RESULT,
    "HOT Dk SETPT            ",  FLOAT,     PARAM,         /* SETPOINT
    "FLOW DIFF 4             ",  FLOAT,     RESULT,
```

Fig-11F

```
"ABS VALUE TYPE          ",   MODULE,    DON'T_CARE,
"FLOW DIFF 4             ",   FLOAT,     RESULT,
"FLOW DIFF 5             ",   FLOAT,     RESULT

"SUBTRACT TYPE           ",   MODULE,    DON'T_CARE,
"FLOW DIFF 5             ",   FLOAT,     RESULT,
"MOVING AVG HD FLOW ERROR",   FLOAT,     RESULT,
"FLOW DIFF 6             ",   FLOAT,     RESULT

"DIVIDE TYPE             ",   MOLDULE,   DON'T_CARE,
"FLOW DIFF 6             ",   FLOAT,     RESULT
"HD FILTER VALUE         ",   FLOAT,     PARAM,
"FLOW DIFF 7             ",   FLOAT,     RESULT

/* FAILSOFT HOT Dk DELTA P, CATCH SENSOR FAILURE, STOP DIAGNOSTICS
"FAILSOFT TYPE           ",   MODULE,    DON'T_CARE,
"HOT Dk DELTA P          ",   FLOAT,     INPUT,
"FLOW DIFF 7             ",   FLOAT,     RESULT
"ZERO                    ",   FCONST,    0.0,       /* FAILSOFT INPUT   */
"FLOW DIFF 7             ",   FLOAT,     RESULT

"IF SKIP TYPE     ",   MODULE,    DON'T_CARE,
"BYTE SKIP DIAG   ",   BINARY,    RESULT,    /* NOT (OCC. OR. STANDBY) OR SHUTDOWN

"ADD TYPE                ",   MODULE,    DON'T_CARE,
"MOVING AVG HD FLOW ERROR",   FLOAT,     RESULT,
"FLOW DIFF 7             ",   FLOAT,     RESULT
"MOVING AVG HD FLOW ERROR",   FLOAT,     RESULT,
};
```

Fig-11G

```
/*******************************************************************************
 *
 *   DUAL DUCT DIAGNOSTIC SUPPORTED IN HVACPRO 5.10, 8K CONTROLLERS, 10/4/94
 *
 *******************************************************************************

SYMBOL MOVING_AVG_TLCD_FLOW_ERROR_REVD [ ] = {
    "SUBTRACT TYPE          ",  MODULE,   DON'T_CARE,
    "COLD Dk FLOW           ",  FLOAT,    RESULT,
    "COLD Dk SETPT          ",  FLOAT,    PARAM,        /* SETPOINT
    "FLOW DIFF              ",  FLOAT,    RESULT,

"ABS VALUE TYPE         ",  MODULE,   DON'T_CARE,
    "FLOW DIFF              ",  FLOAT,    RESULT,
    "FLOW DIFF 1            ",  FLOAT,    RESULT

"SUBTRACT TYPE          ",  MODULE,   DON'T_CARE,
    "FLOW DIFF 1            ",  FLOAT,    RESULT,
    "MOVING AVG CD FLOW ERROR", FLOAT,    RESULT,
    "FLOW DIFF 2            ",  FLOAT,    RESULT

"DIVIDE TYPE            ",  MODULE,   DON'T_CARE,
    "FLOW DIFF 2            ",  FLOAT,    RESULT
    "CD FILTER VALUE        ",  FLOAT,    PARAM,
    "FLOW DIFF 3            ",  FLOAT     RESULT

/* FAILSOFT COLD Dk DELTA P, CATCH SENSOR FAILURE, STOP DIAGNOSTICS
    "FAILSOFT TYPE          ",  MODULE,   DON'T_CARE,
    "COLD Dk DELTA P        ",  FLOAT,    INPUT,
    "FLOW DIFF 3            ",  FLOAT,    RESULT
    "ZERO                   ",  FCONST,   0.0,          /* FAILSOFT INPUT   */
    "FLOW DIFF 3            ",  FLOAT,    RESULT

"IF SKIP TYPE           ",  MODULE,   DON'T_CARE,
    "BYTE SKIP DIAG         ",  BINARY,   RESULT,       /* NOT (OCC. OR. STANDBY) OR SHUTDOWN

"ADD TYPE               ",  MODULE,   DON'T_CARE,
    "MOVING AVG CD FLOW ERROR", FLOAT,    RESULT,
    "FLOW DIFF 3            ",  FLOAT,    RESULT,
    "MOVING AVG CD FLOW ERROR", FLOAT,    RESULT,

"SUBTRACT TYPE          ",  MODULE,   DON'T_CARE,
    "HOT Dk FLOW            ",  FLOAT,    RESULT,
    "HOT Dk SETPT           ",  FLOAT,    PARAM,        /* SETPOINT
    "FLOW DIFF 4            ",  FLOAT,    RESULT,

"ABS VALUE TYPE         ",  MODULE,   DON'T_CARE,
    "FLOW DIFF 4            ",  FLOAT,    RESULT,
    "FLOW DIFF 5            ",  FLOAT,    RESULT

"SUBTRACT TYPE          ",  MODULE,   DON'T_CARE,
    "FLOW DIFF 5            ",  FLOAT,    RESULT,
    "MOVING AVG HD FLOW ERROR", FLOAT,    RESULT,
    "FLOW DIFF 6            ",  FLOAT,    RESULT
```

Fig-11H

```
        "DIVIDE TYPE              ",     MODULE,       DON'T_CARE,
        "FLOW DIFF 6              ",     FLOAT,        RESULT
        "HD FILTER VALUE          ",     FLOAT,        PARAM,
        "FLOW DIFF 7              ",     FLOAT,        RESULT

/* FAILSOFT TOTAL Dk DELTA P, CATCH SENSOR FAILURE, STOP DIAGNOSTICS
        "FAILSOFT TYPE            ",     MODULE,       DON'T_CARE,
        "TOTAL Dk DELTA P         ",     FLOAT,        INPUT,
        "FLOW DIFF 7              ",     FLOAT,        RESULT
        "ZERO                     ",     FCONST,       0.0,       /* FAILSOFT INPUT      */
        "FLOW DIFF 7              ",     FLOAT,        RESULT

"IF SKIP TYPE       ",  MODULE,   DON'T_CARE,
        "BYTE SKIP DIAG     ",  BINARY,   RESULT,           /* NOT (OCC. OR. STANDBY) OR SHUTDOWN

"ADD TYPE                 ",     MODULE,       DON'T_CARE,
        "MOVING AVG HD FLOW ERROR ",     FLOAT,        RESULT,
        "FLOW DIFF 7              ",     FLOAT,        RESULT
        "MOVING AVG HD FLOW ERROR ",     FLOAT,        RESULT,
        };
```

Fig-11J

```
/*********************************************************************
/*
/*   DUAL DUCT DIAGNOSTIC SUPPORTED IN HVACPPRO 5.10, 8K CONTROLLERS, 10/4/94
/*
/*********************************************************************

SYMBOL MOVING_AVG_TLHD_FLOW_ERROR_REVD [] = {
    "SUBTRACT TYPE            ",  MODULE,   DON'T_CARE,
    "COLD Dk FLOW             ",  FLOAT,    RESULT,
    "COLD Dk SETPT            ",  FLOAT,    PARAM,      /* SETPOINT
    "FLOW DIFF                ",  FLOAT,    RESULT,

"ABS VALUE TYPE           ",  MODULE,   DON'T_CARE,
    "FLOW DIFF                ",  FLOAT,    RESULT,
    "FLOW DIFF 1              ",  FLOAT,    RESULT

"SUBTRACT TYPE            ",  MODULE,   DON'T_CARE,
    "FLOW DIFF 1              ",  FLOAT,    RESULT,
    "MOVING AVG CD FLOW ERROR ",  FLOAT,    RESULT,
    "FLOW DIFF 2              ",  FLOAT,    RESULT

"DIVIDE TYPE              ",  MODULE,   DON'T_CARE,
    "FLOW DIFF 2              ",  FLOAT,    RESULT
    "CD FILTER VALUE          ",  FLOAT,    PARAM,
    "FLOW DIFF 3              ",  FLOAT,    RESULT

/* FAILSOFT TOTAL Dk DELTA P, CATCH SENSOR FAILURE, STOP DIAGNOSTICS
    "FAILSOFT TYPE            ",  MODULE,   DON'T_CARE,
    "TOTAL Dk DELTA P         ",  FLOAT,    INPUT,
    "FLOW DIFF 3              ",  FLOAT,    RESULT
    "ZERO                     ",  FCONST,   0.0,        /* FAILSOFT INPUT  */
    "FLOW DIFF 3              ",  FLOAT,    RESULT

"IF SKIP TYPE     ",  MODULE,  DON'T_CARE,
    "BYTE SKIP DIAG   ",  BINARY,  RESULT,              /* NOT ( OCC OR STANDBY) OR SHUTDOWN

"ADD TYPE                 ",  MODULE,   DON'T_CARE,
    "MOVING AVG CD FLOW ERROR ",  FLOAT,    RESULT,
    "FLOW DIFF 3              ",  FLOAT,    RESULT
    "MOVING AVG CD FLOW ERROR ",  FLOAT,    RESULT,

"SUBTRACT TYPE            ",  MODULE,   DON'T_CARE,
    "HOT Dk FLOW              ",  FLOAT,    RESULT,
    "HOT Dk SETPT             ",  FLOAT,    PARAM,      /* SETPOINT
    "FLOW DIFF 4              ",  FLOAT,    RESULT,

"ABS VALUE TYPE           ",  MODULE,   DON'T_CARE,
    "FLOW DIFF 4              ",  FLOAT,    RESULT,
    "FLOW DIFF 5              ",  FLOAT,    RESULT

"SUBTRACT TYPE            ",  MODULE,   DON'T_CARE,
    "FLOW DIFF 5              ",  FLOAT,    RESULT,
    "MOVING AVG HD FLOW ERROR ",  FLOAT,    RESULT,
    "FLOW DIFF 6              ",  FLOAT,    RESULT
```

Fig-11K

```
/*****************************************************************
/*
/* DUAL DUCT DIAGNOSTIC SUPPPORTED IN HVACPRO 5.10,  9/28/94
/*
/*****************************************************************
SYMBOL MOVING_AVG_ZONE_TEMP_ERROR [ ]  = {
/* CALC HEAT MODE
        "NEG COMPARE TYPE    ",    MODULE,    DON'T_CARE,
        "FSOFT ZONE TEMP     ",    FLOAT,     RESULT,
        "ACTUAL HTG SETPT    ",    FLOAT,     RESULT,      /* HEATING SETPOINT        */
        "ACTUAL HT/CL DB     ",    FLOAT,     RESULT,      /* DEADBAND BETWEEN HTG & CLG
        "HEAT MODE           ",    BINARY,    RESULT,

"MUX TYPE            ",    MODULE,    DON'T_CARE,
        "ACTUAL HTG SETPT    ",    FLOAT,     RESULT,      /* HEATING SETPOINT        */
        "ACTUAL CLG SETPT    ",    FLOAT,     RESULT,      /* COOLING SETPOINT        */
        "HEAT MODE           ",    BINARY,    RESULT,      /* INTO HEATING SIDE
        "SETPT               ",    FLOAT,     RESULT,

/* USE FSOFT ZONE TEMP BECAUSE FAILSOFT WILL CATCH UNRELIABLE TO FOLLOW
        "SUBTRACT TYPE       ",    MODULE,    DON'T_CARE,
        "FSOFT ZONE TEMP     ",    FLOAT,     RESULT,
        "SETPT               ",    FLOAT,     RESULT,
        "OUTPUT DIFF         ",    FLOAT,     RESULT,

"ABS VALUE TYPE      ",    MODULE,    DON'T_CARE,
        "OUTPUT DIFF         ",    FLOAT,     RESULT,
        "OUTPUT DIFF ZT      ",    FLOAT,     RESULT

"SUBTRACT TYPE       ",    MODULE,    DON'T_CARE,
        "OUTPUT DIFF ZT      ",    FLOAT,     RESULT,
        "MOVING AVG ZONE TEMP ERR ", FLOAT,   RESULT,
        "OUTPUT DIFF ZT 1    ",    FLOAT,     RESULT

"DIVIDE TYPE         ",    MODULE,    DON'T_CARE,
        "OUTPUT DIFF ZT 1    ",    FLOAT,     RESULT
        "ZONE TEMP FILTER VALUE ", FLOAT,     PARAM,
        "OUTPUT DIFF ZT 2    ",    FLOAT,     RESULT

/* FAILSOFT ZONE TEMP SENSOR FAILURE, STOP DIAGNOSTICS
        "FAILSOFT TYPE       ",    FLOAT,     DON'T_CARE,
        "ZONE TEMP           ",    FLOAT,     INPUT,
        "OUTPUT DIFF ZT 2    ",    FLOAT,     RESULT
        "ZERO                ",    FCONST,    0.0,         /* FAILSOFT INPUT */
        "OUTPUT DIFF ZT 2    ",    FLOAT,     RESULT

"IF SKIP TYPE        ",    MODULE,    DON'T_CARE,
        "BYTE SKIP DIAG      ",    BINARY,    RESULT,      /* NOT (OCC. OR STANDBY) OR SHUTDOWN

"ADD TYPE            ",    MODULE,    DON'T_CARE,
        "MOVING AVG ZONE TEMP ERR ", FLOAT,   RESULT,
        "OUTPUT DIFF ZT 2    ",    FLOAT,     RESULT,
        "MOVING AVG ZONE TEMP ERR ", FLOAT,   RESULT
};
```

Fig-11L

ON-LINE MONITORING OF CONTROLLERS IN AN ENVIRONMENT CONTROL NETWORK

CROSS REFERENCE TO RELATED APPLICATIONS

The present application is a continuation-in-part of U.S. Ser. No. 08/278,915, filed Jul. 22, 1994, now allowed entitled "Controller for Use in an Environment Control Network Capable of Storing Diagnostic Information," assigned to the assignee of the present application. The present application is also related to U.S. Ser. No. 08/234, 827, filed Apr. 27, 1994 now U.S. Pat. No. 5,446,677, entitled "Diagnostic System for Use in an Environment Control Network," assigned to the assignee of the present invention.

NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

The present invention is related to an environmental control system. More particularly, the present invention is related to a digital controller which stores diagnostic information related to the control of an environment or the operation of controlled devices utilized in an environment control network.

Environment control networks or facility management systems are employed in office buildings, manufacturing facilities, and the like, for controlling the internal environment of the facility. The environment control network may be employed to control temperature, fluid flow, humidity, lighting, boilers, chillers, or security in the internal environment.

For example, in environment control networks configured to control temperature and air flow, controlled air units (variable air volume (VAV) boxes or unitary devices (UNT)) are located throughout the facility and provide environmentally controlled air to the internal environment. The controlled air is provided at a particular temperature or humidity so that a comfortable internal environment is established.

The VAV boxes are coupled to an air source which supplies the controlled air to the VAV box via duct work. VAV boxes and unitary devices may include a fan or other device for blowing the controlled air. VAV boxes and unitary devices provide the controlled air through a damper. The damper regulates the amount of the controlled air provided to the internal environment. The damper is coupled to an actuator which preferably positions the damper so that appropriate air flow (measured in cubic feet per minute (CFM)) is provided to the internal environment.

A digital controller is generally associated with at least one actuator and damper. The controller receives information related to the air flow and temperature in the internal environment and appropriately positions the actuator so that the appropriate air flow is provided to the internal environment. The controller may include sophisticated feedback mechanisms such as proportional integral derivative (PID) control algorithms. Sophisticated feedback mechanisms allow the actuator to be positioned more precisely.

The controller may be coupled to a communication bus within the environment control network and is able to communicate with other components within the environment control network. For example, the controller may include circuitry which indicates when the controller has experienced a catastrophic malfunction. A message indicative of this malfunction may be communicated to components within the network across the communication bus. Also, the controllers may receive hazardous warning messages on the communication bus, such as a fire warning, and be configured to close all dampers in response to a fire warning. Thus, the controllers are generally capable of receiving and transmitting information and messages from other components within the environment control network.

Environment control networks for large buildings frequently include an operator workstation for monitoring messages, entering time schedules for lights, and system startup and shutdown schedules. Alternatively, the operator may monitor the network remotely using modems to communicate with digital controllers through laptops or other commissioning devices. Heretofore, service people were required to periodically perform diagnostic tests to determine if a particular controlled air unit (VAV boxes and unitary devices) or digital controller is operating properly. For example, in conventional systems, service people generally have no information about the control signals to the actuator, the temperature error in the environment, air flow error, or temperature and air flow sensor signals when the service people are away.

Conventional environmental networks have not included a diagnostic or performance monitor system for automatically and periodically recording summary data or performance indices indicative of quality and stability of control, temperature error, and air flow rate error over time. Thus, there is a need for a controller configured to store data associated with the operation of the actuator and associated controller.

SUMMARY OF THE INVENTION

The present invention relates to a controller operatively associated with a unit which provides forced air to an environment. The unit includes an actuator which controls an amount of the forced air provided to the environment. The controller includes an actuator output, a communication port, a memory, and a processor. The actuator output is coupled with the actuator or other appliance such as a motor or pump, and provides an actuator signal for controlling the position of the actuator or operation of the appliance. The processor is configured to generate and store weighted average data related to the actuator signal.

The present invention also relates to a method of generating a performance index for monitoring performance of controllers in a control network. The controllers are coupled together on a communication link and cooperate to control a process. The method includes the steps of periodically sampling a parameter related to the process with each of the plurality of controllers, generating a new time weight average of the parameter in accordance with the parameter and a stored time weight average of the parameter, the new time weight average being the performance index, and storing the new time weight average of the parameter as the stored time weight average.

The present invention also relates to an environment control system including a work station and a plurality of units. Each of the units provides forced air to an environment and is associated with a controller. Each controller is coupled to the work station via a communication bus and includes an environment sensor, a memory, and a processor. The environment sensor provides a parameter value related to the environment. The parameter value is provided over time. The processor is coupled with memory and the environment sensor. The processor is configured to cyclically receive the parameter value and generate an exponentially weighted moving average index of the parameter value and store the index in the memory. The processor is able to provide the index to the communication bus.

The present invention also relates to a VAV controller operatively associated with a VAV box and coupled with a first communication bus. The VAV controller includes a parameter input means, a communication port, a memory means and a processor means. The parameter input means receives a parameter value, and the memory means stores diagnostic information. The communication port is coupled with the first communication bus. The processor means is coupled with a memory means, the parameter means, and communication port. The processor means receives the parameter value at the parameter input and generates the diagnostic information. The diagnostic information is related to an exponentially weighted moving average (EWMA) associated with the parameter value. The processor means is also configured to provide the diagnostic information to the communication port.

Aspects of the present invention advantageously provide indices or diagnostic information such as time weighted averages indicative of the operation of the actuator and controller. The indices may be related to the error (e.g., actual process output minus setpoint) of various parameters, process output, change in the controller output, the actual actuator position, or change in actuator position. The time weighted averages are stored and generated in the digital controllers to advantageously reduce the communication burden on the network and processing burden on the central workstation. The time weighted averages more accurately reflect the present operating status of the controller and may provide information for adjusting the setpoints and PID algorithm associated with the controller.

In another aspect of the invention, the time weighted average is an exponentially weighted moving average (EWMA) for accurately reflecting the current operating status of the controller. The numerically efficient EWMA or performance index may include the EWMA of absolute value error for temperature, air flow pressure or humidity. The EWMA of the process output such as the actual temperature, water flow, pressure, humidity or air flow, the EWMA of the change in the controller output such as the position signal to the actuator or temperature signal to the VAV box, the EWMA of the actuator position, the EWMA of the duty cycle, or the EWMA of the number or frequency of starts, stops and reversals of the actuator. The EWMA allows the operator to quickly ascertain whether a controller is operating without analyzing a large amount of data.

BRIEF DESCRIPTION OF THE DRAWINGS

The invention will hereafter be described with reference to the accompanying drawings, wherein like numerals denote like elements, and:

FIGS. 11A–H and J–L show pseudo code in accordance with an exemplary aspect of the present invention.

DETAILED DESCRIPTION OF THE PREFERRED EXEMPLARY EMBODIMENT OF THE PRESENT INVENTION

Figure 1:
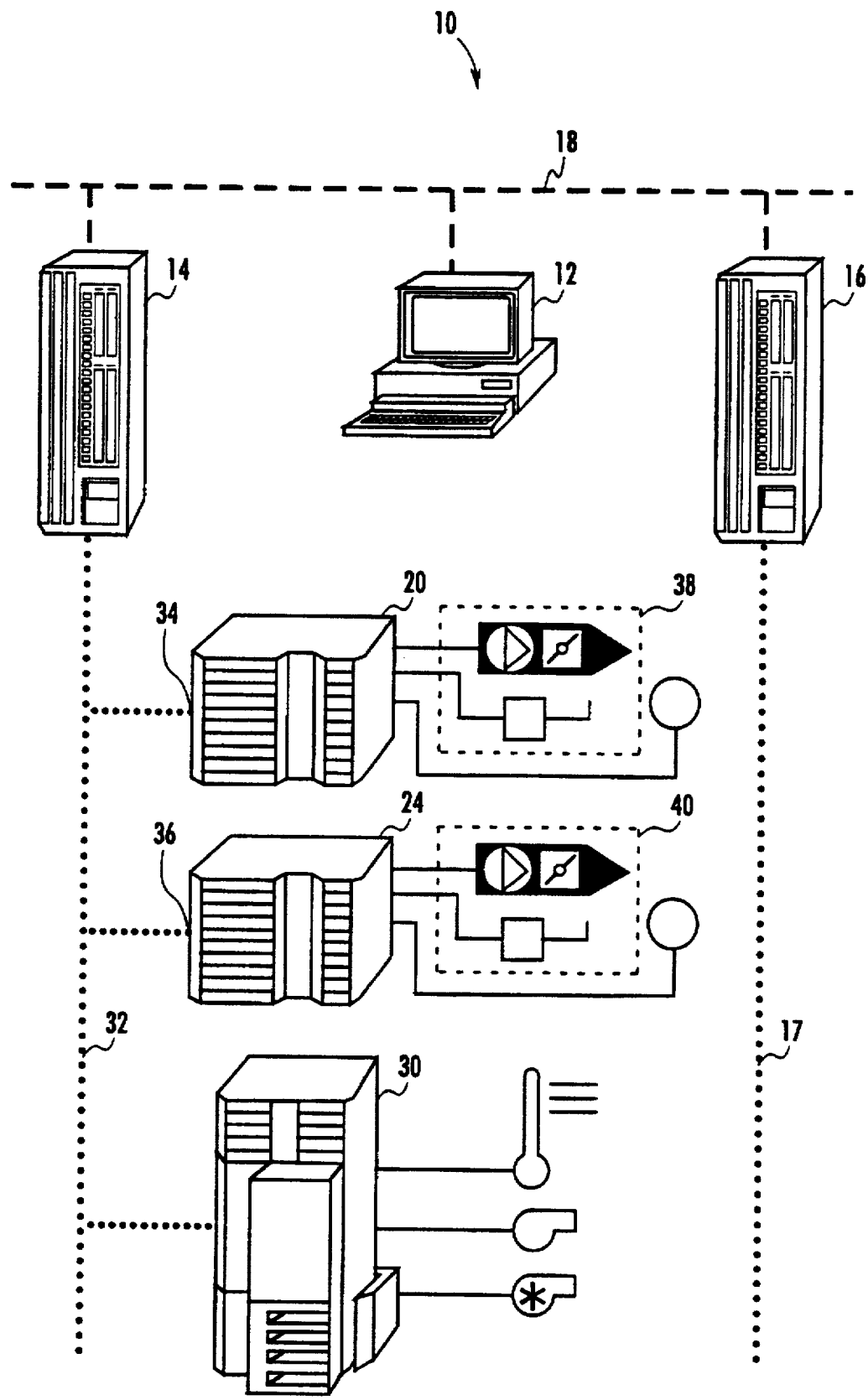
FIG. 1 is a simplified schematic block diagram of an environment control system.

Referring to FIG. 1, an environment control system or network 10 includes a work station 12, a station 14, a station 16, a controller 20, a controller 24, and a controller or module 30. Controllers 20, 24 and module 30 are coupled with station 14 via a communication bus 32. Work station 12, station 14 and station 16 are coupled together via a communication bus 18. Station 16 is also coupled to a communication bus 17. Communication bus 17 may be coupled to additional sections or additional controllers, as well as other components utilized in environment control network 10.

Preferably, environment control network 10 is a facilities management system such as the Metasys™ system as manufactured by Johnson Controls, Inc. (JCI) for use with VAV boxes 38 and 40. Alternatively, network 10 can be a unitary system having roof-top units or other damper systems. Stations 14 and 16 are preferably an NCU station manufactured by JCI, and controllers 20 and 24 are VAV 100™ controllers manufactured by JCI. Controller or module 30 is preferably an air handler control unit (AHU) such as a AHU 102-0™ unit manufactured by JCI for monitoring and effecting the operation of an air handler (not shown) which provides forced air for network 10.

Communication buses 17 and 32 are N2 buses preferably comprised of a twisted pair of conductors, and communication bus 18 is a LAN (N1) bus for high level communications preferably comprised of a twisted pair of conductors or coaxial cable. Bus 18 is a high speed bus using ARC-NET™ protocol. Work station 12 and stations 14 and 16 include ARCNET communication hardware. Buses 17 and 32 utilize RS485 protocol. Controllers 20 and 24, module 30, and stations 14 and 16 include RS485 communication hardware. Preferably, controllers 20 and 24, stations 14 and 16, and work station 12 include communication software for transmitting and receiving data and messages on buses 17, 18 and 32.

Controller 20 is operatively associated with a controlled air unit such as VAV box 38, and controller 24 is operatively associated with a controlled air unit such as VAV box 40. Controller 20 communicates with work station 12 via communication bus 32 through station 14 and communication bus 18. Preferably, station 14 multiplexes data over communication bus 32 to communication bus 18. Station 14 operates to receive data on communication bus 32, provide data to communication bus 18, receive data on communication bus 18, and provide data to communication bus 32. Station 14 preferably is capable of other functions useful in environment control network 10. Work station 12 is preferably a personal computer (not shown). A portable computer may be coupled to communication bus 32 or bus 17.

Figure 2:
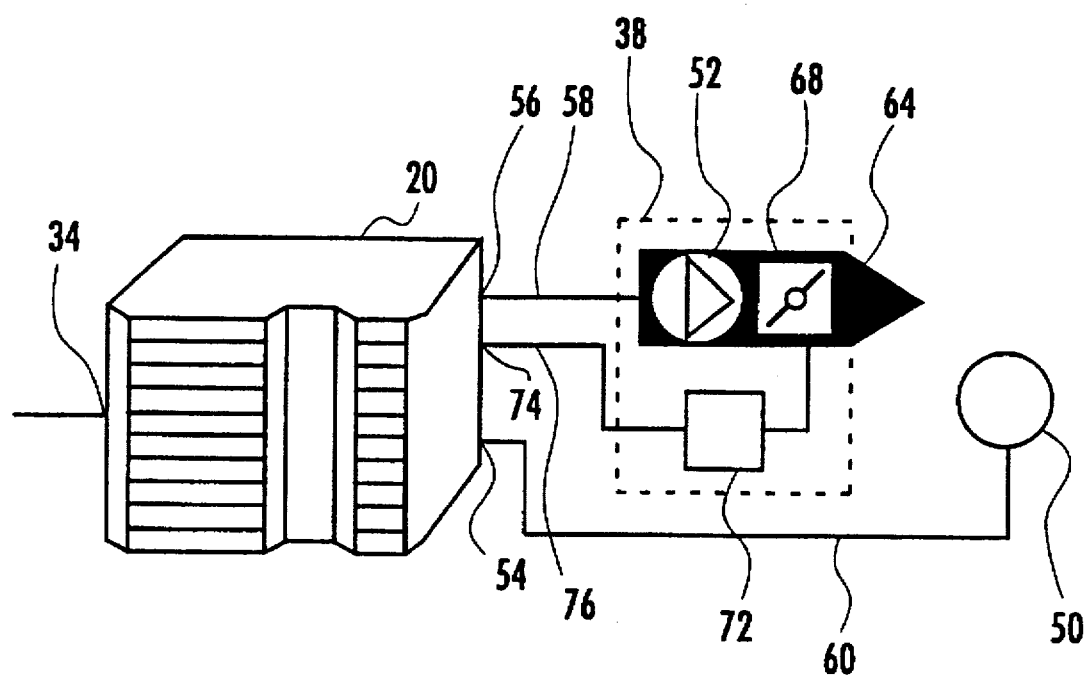
FIG. 2 is a more detailed schematic block diagram of a controller and a VAV box for use in the environment control system illustrated in FIG. 1.

The following is a more detailed description of controller 20 and VAV box 38 with reference to FIG. 2. Controller 20 is preferably a direct digital control (DDC) which includes a communication port 34 coupled with communication bus 32 (FIG. 1). Controller 20 preferably includes an air flow input 56, a temperature input 54, and an actuator output 74. VAV box 38 may additionally include fans, heating or cooling units, exhaust dampers, and return dampers (not shown) for treating an air flow 64. Inputs 54 and 56 are preferably analog inputs received by an A/D converter (not shown) in controller 20. Controller 20 preferably includes circuitry and software for conditioning and interpreting the signals on inputs 54 and 56.

VAV control box 38 preferably includes a damper 68, an air flow sensor 52, and an actuator 72. Actuator 72 positions damper 68 and is preferably an electric motor based actuator. Alternatively, actuator 72 and controller 20 may be pneumatic or any other type of device for controlling and positioning damper 68. Actuator 72 is preferably an EDA-2040™ motor manufactured by JCI having a full stroke time ($T_{stroke}$) of 1, 2, or 5.5 minutes for a 90° stroke.

The position of damper 68 controls the amount of air flow 64 provided to environment 66. Environment 66 is preferably a room, hallway, building, or portion thereof or other internal environment. Air flow sensor 52 preferably provides a parameter such as an air flow parameter across conductor 58 to air flow input 56. The air flow parameter represents the amount of air flow 64 provided through damper 68 to an environment 66.

Controller 20 provides an actuator output signal to actuator 72 from actuator output 74 via a conductor 76. Controller 20 receives a temperature signal from a temperature sensor 50 across a conductor 60 at temperature input 54. Temperature sensor 50 is generally a resistive sensor located in environment 66.

Air flow sensor 52 is preferably a differential pressure ($\Delta P$) sensor which provides a $\Delta P$ factor related to air flow (volume/unit time, hereinafter CFM air flow). CFM air flow may be calculated by the following equation:

$$CMF \text{ Air Flow} = 4005 \left( \sqrt{\frac{\Delta P}{K}} \right) \times \text{Box Area} \quad (1)$$

where: $\Delta P$ is the pressure drop in inches of water gauge from air flow sensor 52;

Box Area is the inlet supply cross-section area in square feet; and

K is a multiplier representing the gain of the air flow pickup.

The value K and value of box area are stored in a memory (not shown) in controller 20 when controller 20 is initialized or coupled with VAV box 38. The value of box area is generally in the range of 0.08 to 3.142 feet squared, and the value of K is generally between 0.58 and 13.08. The value of box area and K may be advantageously communicated from controller 20 to work station 12 so that service people do not have to otherwise obtain these values from paper data sheets and files. Air flow sensor 52 is preferably a diaphragm-based pressure sensor.

With reference to FIGS. 1 and 2, the operation of network 10 is described as follows. Controllers 20 and 24 are configured to appropriately position actuator 72 in accordance with a cyclically executed control algorithm. The control algorithm is preferably a proportional (P), proportional integral (PI), or a proportional-integral derivative (PID) control algorithm. In accordance with the algorithm, controller 20 receives the air flow value at input 56, the temperature value at input 54, and other data (if any) from bus 32 at port 34 every cycle, preferably every 1.5 seconds. Controller 20 provides the actuator output signal at the actuator output 74 every cycle to accurately position damper 68 so that environment 66 is appropriately controlled (heated, cooled, or otherwise conditioned). Thus, controller 20 cyclically responds to the air flow value and the temperature value and cyclically provides the actuator output signal to appropriately control internal environment 66.

Preferably, the actuator output signals are pulse width signals which cause actuator 72 to move forward, backward, or stay in the same position, and controller 20 internally keeps track of the position of actuator 72 as it is moved. Alternatively, actuator 72 may provide feedback indicative of its position, or the actuator signal may indicate the particular position to which actuator 72 should be moved.

Figure 3:
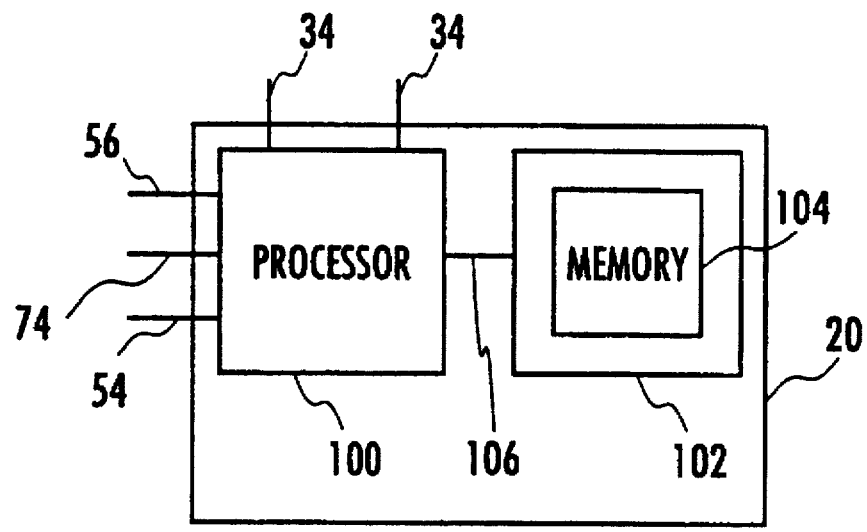
FIG. 3 is a more detailed schematic block diagram of the controller illustrated in FIG. 2.

FIG. 3 is a more detailed block diagram of controller 20 in accordance with an exemplary aspect of the present invention. Controller 20 includes a processor 100 coupled with actuator output 74, temperature input 54, air flow input 56, and communication port 34. Processor 100 is preferably an 80C652 processor and communication port 34 is coupled with a twisted pair of conductors comprising communication bus 32 (FIG. 1).

Controller 20 also includes a memory 102. Memory 102 may be any storage device including but not limited to a disc drive (hard or floppy), a RAM, EPROM, EEPROM, flash memory, static RAM, or any other device for storing information. Preferably, memory 102 includes RAM for storing performance indices, diagnostic information or summary data in locations 104 and an EEPROM for storing instructions and the PID algorithm. Processor 100 preferably calculates the EWMA of the performance indices and stores the EWMA in memory 102. Memory 102 is coupled to processor 100 via an internal bus 106.

Figure 4:
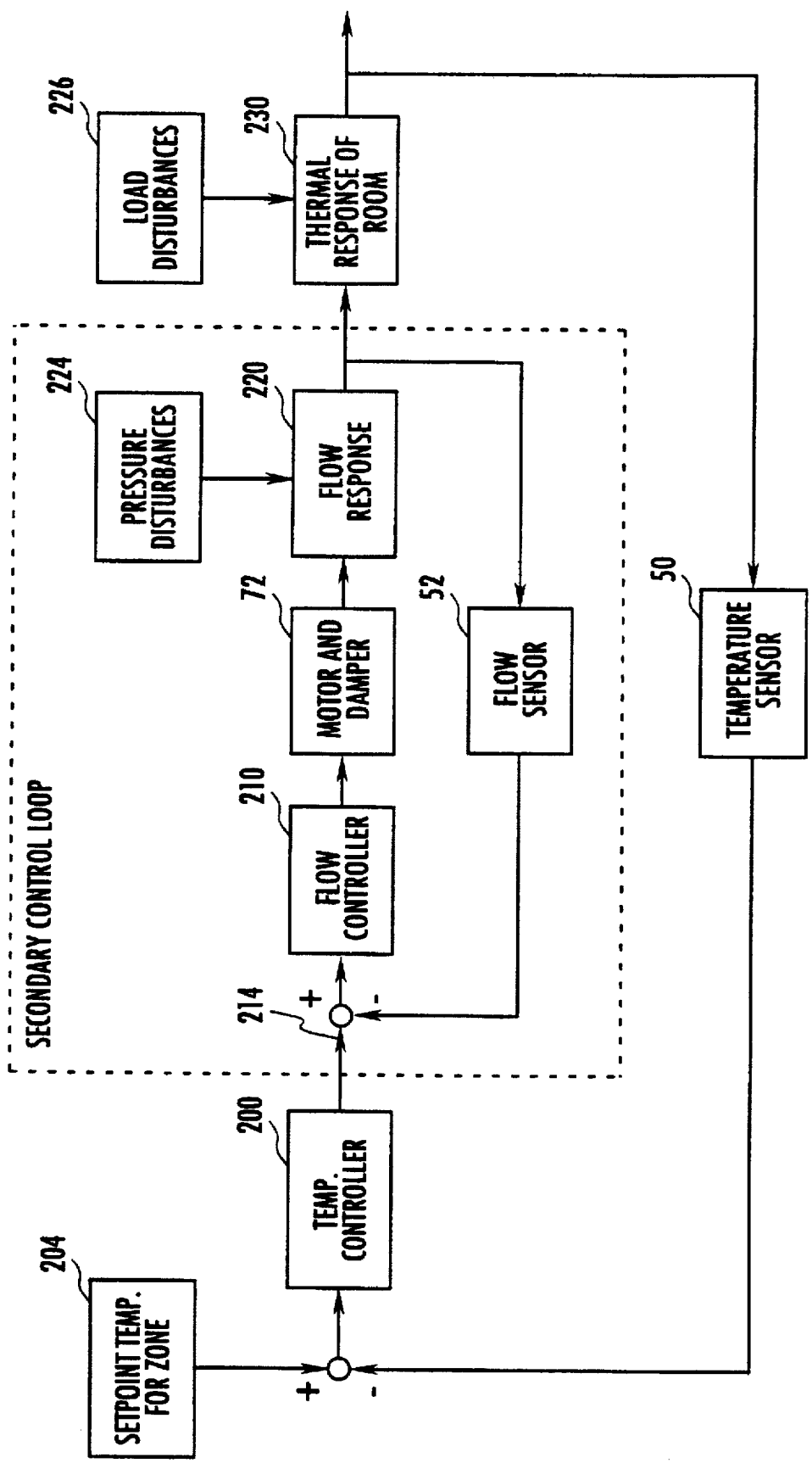
FIG. 4 is a block diagram schematically illustrating cascade control of room temperature by the controller illustrated in FIG. 2.

The operation of controller 20 is described in more detail below with reference to FIGS. 1-4. FIG. 4 is a block diagram representing the cascade control of a parameter such as room temperature for environment 66. At temperature controller stage 200, processor 100 receives the actual temperature of environment 66 from sensor 50 and a temperature setpoint from a thermostat 204 or other device. Temperature controller stage 200 provides a signal to flow controller stage 210. The temperature control signal is generated by processor 100 in accordance with the PID algorithm so that environment 66 reaches the desired temperature.

At flow controller stage 210, processor 100 receives the actual air flow from flow sensor 52 and the temperature control signal and determines the appropriate air flow to be provided to environment 66 in accordance with the PID algorithm. Flow controller stage 210 operates to move actuator 72 to move damper 68 (FIG. 2) so that internal environment 66 reaches the appropriate temperature.

Pressure disturbances 224 from internal environment 66 or within VAV box 38 may affect flow response 220 of VAV box 38. Flow response 220 is sampled by flow sensor 52, which provides the actual air flow as discussed above.

Similarly, load disturbances 226 may affect thermal response 230 of internal environment 66. Load disturbances 226 may result from door use, people, or other actions or inactions which may affect the temperature within internal environment 66. Thermal response 230 is sampled by temperature sensor 50, which provides the actual temperature as discussed above. Processor 100 compensates for pressure disturbances 224 and load disturbances 226 in stages 200 and 210 so that the temperature and air flow in environment 66 is comfortable.

Preferably, the cascade control is implemented in the PID algorithm executing within processor 100 of controller 20. In accordance with the PID algorithm, processor 100 also calculates and stores diagnostic or performance indices. The calculation of performance indices by processor 100 in controller 20 is discussed with reference to FIGS. 4–8 below. Performance indices may include parameters such as the absolute value error for temperature, pressure, air flow or humidity. These indices may also include the actual temperature measured by temperature sensor 50 or air flow measured by sensor 52, the change in the actuator position signal, the temperature setpoint provided by thermostat 204, the duty cycle of actuator 72, or the number of starts, stops and reversals of actuator 72. Controller 20 may be configured to track the number of starts, stops and reversals of actuator 72.

The performance indices are preferably a time weighted average. Time weighting eliminates overreaction from out-of-bounds measurements taken in the past. For example, large errors may be present as network 10 is first started up. Such large areas are generally not relevant to the current performance of controller 20 or VAV box 38. Time weighting also prevents recent measurements from being rendered meaningless. For example, if controller 20 averages measurements taken over a long period of time, recent measurements which are abnormal are not ascertainable because the average is not significantly affected.

Preferably, processor 100 calculates the time weighted averages as exponentially weighted moving averages (EWMA). The EWMA may be utilized in a variety of control and diagnostic systems including chemical applications, flight control, energy systems, lighting systems, and other environments. EWMA is calculated according to Equation 2 as follows:

$$\overline{X}_t = \sum_{j=0}^{\infty} \lambda(1-\lambda)^j X_{t-j} \quad (2)$$

where $\overline{X}_t$=EWMA at time t $\gamma$=exponential smoothing constant or filter value;

$X_{t-j}$=value of signal at time t−j

Equation 2 may be reformatted as Equation 3 as follows:

$$\overline{X}_t = \overline{X}_{t-1} + \gamma(X_t - \overline{X}_{t-1}) \quad (3)$$

The EWMA is advantageous because only one previous value ($\overline{X}_{t-1}$) must be stored as shown in Equation 3, thereby relieving memory 102 of large storage burdens. $\overline{X}_t$ may be replaced by $e_t$ of $|e_t|$ for error indices, $\overline{Y}_t$ for process output indices such as temperature or air flow, $\Delta U_t$ for difference in the output of controller 20 such as the differences in the actuator signal, $U_t$ for the output of controller 20 such as the actuator position signal, $d_t$ for the duty cycle of actuator 72, and $S_t$ for frequency parameters such as the number of starts, stops, or reversals of actuator 72. The $\gamma$ may be adjusted for various conditions; as $\gamma$ increases, the EWMA is less dependent on past data. Also, $\gamma$ should be set according to the sampling times of the A/D converters associated with controller 20 according to Equation 4 below:

$$\frac{T}{5t_s} > \lambda > \frac{T}{20t_s} \quad (4)$$

where:

T is the sampling time of controller 20; and $t_s$ is the settling time associated with the control system (e.g., network 10, or VAV box 38).

Preferably, the smoothing constant $\gamma$ is related to the response of network 10 so that the EWMA accurately reflects performance. T is generally between 1 and 1.5 seconds for controller 20. The constant should be optimized so temporary local disturbances do not unnecessarily disturb the EWMA and yet the EWMA appropriately reacts to parameter values which indicate a malfunctioning controller 20, actuator 72 motor, VAV box 38 or other component.

The calculation of the EWMA for performance indices such as temperature error and air flow error are discussed below with reference to FIGS. 8 and 9. The absolute value of error or actual error may be utilized. The EWMA of other performance indices such as temperature of environment 66 may be taken by sampling the temperature provided by sensor 50 and calculating the EWMA of the temperature. The EWMA of the temperature of environment 66 may be advantageous for determining the preferred setting for temperature in a particular room in environment 66. Alternatively, the setting of thermostat 204 may be sampled and the EWMA of that setting may be taken to indicate an occupant preference for room temperature in environment 66.

Figure 5:
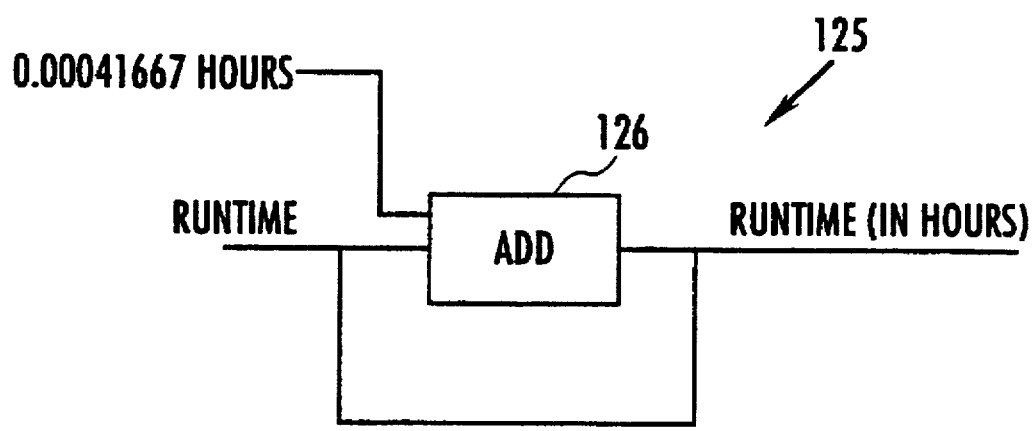
FIG. 5 is a block diagram illustrating the calculation of the actuator run time data for the controller illustrated in FIG. 3.
Figure 6:
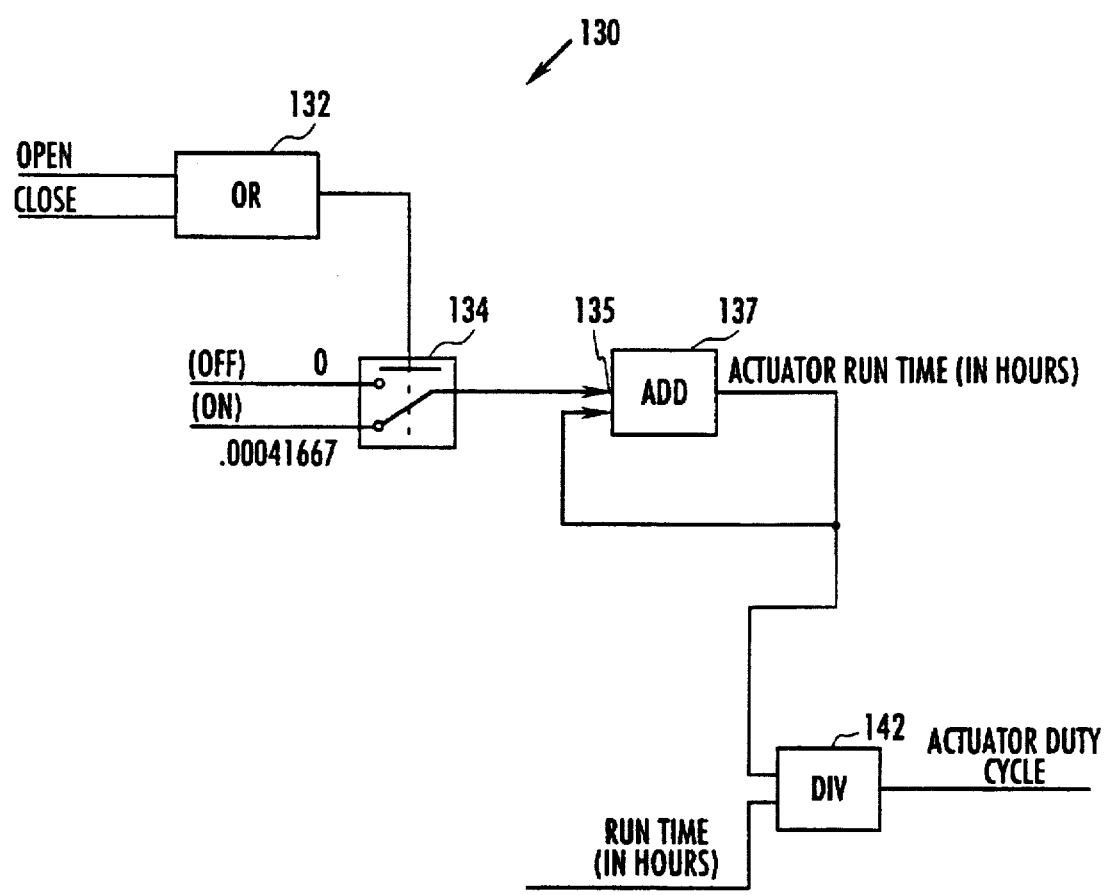
FIG. 6 is a block diagram illustrating the calculation of actuator duty cycle data for the controller shown in FIG. 3.

With reference to FIGS. 5–6, controller 20 may calculate the duty cycle of actuator 72 as a performance index. The EWMA of the duty cycle may be calculated to provide a numerically efficient indication of the performance of actuator 72. In FIG. 5, controller 20 is programmed to operate as a run time circuit 125 which generates run time data. The run time data is necessary to calculate the duty cycle. Circuit 125 cyclically (every 1.5 seconds or 0.00041667 hours) calculates the run time as part of the control algorithm. Circuit 125 includes an adder 126 which reads the run time data stored in locations 104 of memory 102, adds 0.00041667 hours per execution to the run time data, and stores the sum in locations 104 of memory 102 as the new run time data every cycle of the control algorithm (0.00041667 hours). Circuit 125 therefore accurately accumulates the run time data (in hours) or ON time of controller 20. The run time data in hours is also stored in locations 104 of memory 102.

With reference to FIG. 6, controller 20 is programmed as a duty cycle circuit 130 which generates duty cycle data associated with the operation of actuator 72. Duty cycle circuit 130 may be configured to determine the duty cycle of various actuator 72 or dampers 68 in a VAV box 38. For example, if VAV box 38 includes dual ductwork (heating and cooling ducts), circuit 130 may calculate the duty cycle for the dampers associated with each duct. The duty cycle is the amount of time that actuator 72 is moving (opening or closing damper 68) divided by the controller run time. Sense circuit 132 of circuit 130 determines if the control algorithm is instructing actuator 72 to open or close. Alternatively, processor 100 can determine whether actuator 72 is being opened or closed by directly sampling the actuator control signal at actuator output 74.

If actuator 72 is being moved, an adder 137 in circuit 130 reads actuator run time data stored in locations 104, adds the value 0.00041667 hours, and stores the sum as the actuator run time data in locations 104. If actuator 72 is not being moved, adder 137 reads the actuator run time, adds the value 0, and stores the actuator run time data in locations 104. The value 0.00041667 hours or 0 is provided to an input 135 is provided by a circuit 134. Circuit 134 is controlled by sense circuit 132 and provides the value 0.00041667 hours when actuator 72 is being moved. Similar to circuit 125, circuit 130 updates the duty cycle data every 0.00041667 hours so that the actuator run time data is accurately accumulated.

The actuator run time data in hours and stores it in locations 104 of memory 102. Divider 142 divides the actuator run time data in hours by the controller run time in hours to obtain duty cycle data. The duty cycle data provides HVAC system designers significant information about maximizing the life of actuator 72. Controller 20 may also be configured to calculate the EWMA of the duty cycle of actuator 72 in accordance with Equation 3.

The EWMA of the duty cycle can be utilized to analyze the effectiveness of the PID algorithm or other feedback control algorithms. For example, a large duty cycle (over 5%) may indicate that actuator 72 is overhunting thereby causing excessive wear and premature failure of actuator 72. Preferably, actuator 72 has a duty cycle of less than 5% over a 24 hour period. A high duty cycle may also indicate that VAV box 38 is improperly sized or that the ductwork associated with VAV box 38 is faulty.

Alternatively, processor 100 may calculate the number or frequency of starts, stops or reversals of actuator 72. For example, by monitoring the position signal, the processor may store a count on the number of starts, stops or reversals for a unit time. This number of starts, stops or reversals may be stored in locations 104 of memory 102. The EWMA of this number stored in locations 104 in memory 102 may be taken to provide a indicator of the wear of actuator 72. The EWMA of the duty cycle is advantageously calculated in a numerically efficient manner as discussed above.

Further, controller 20 may be configured to sample the position of damper 68 and perform the EWMA of the sampled positions. If EWMA of the position is large, VAV box 38 may be saturated. The saturated condition may be due to an undersized VAV box 38, a malfunctioning actuator 72 or damper 68, or an inefficient PID algorithm. Alternatively, controller 20 may be configured to calculate the EWMA of the change in the actuator signal as the position of damper 68 varies between 0 and 100% opened. The EWMA of the change of the position in damper 68 advantageously provides data about the nature of the wear associated with actuator 72 and damper 68. A large EWMA of change in position indicates that actuator 72 is being moved excessively.

Figure 7:
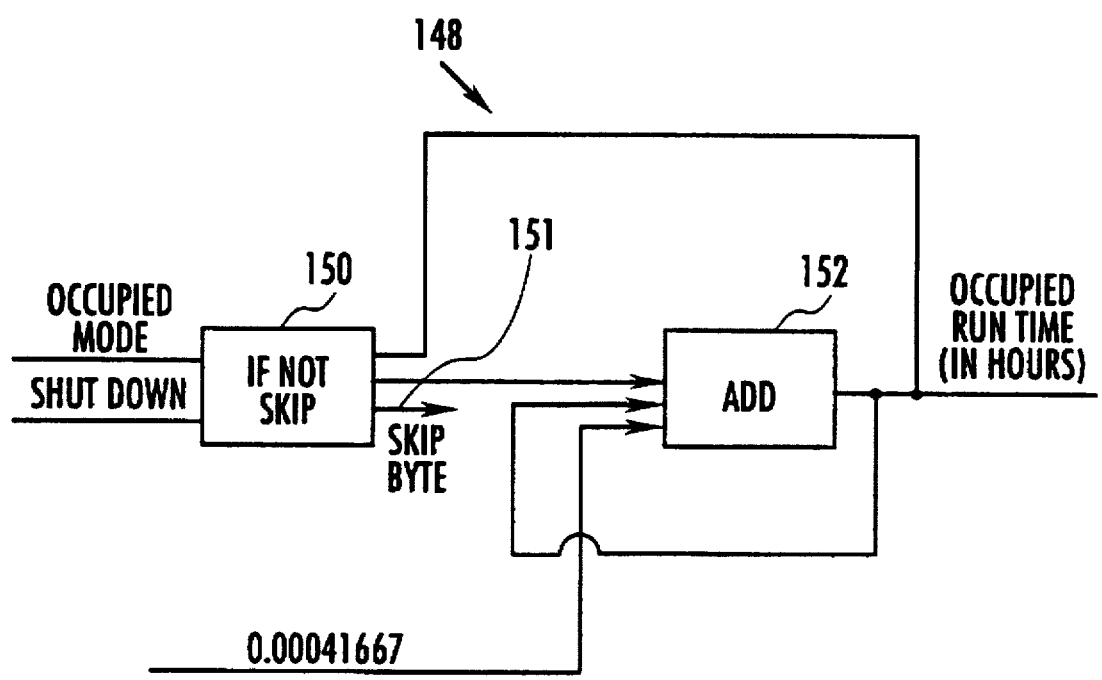
FIG. 7 is a block diagram illustrating the calculation of occupied run time data for the controller shown in FIG. 3.
Figure 8:
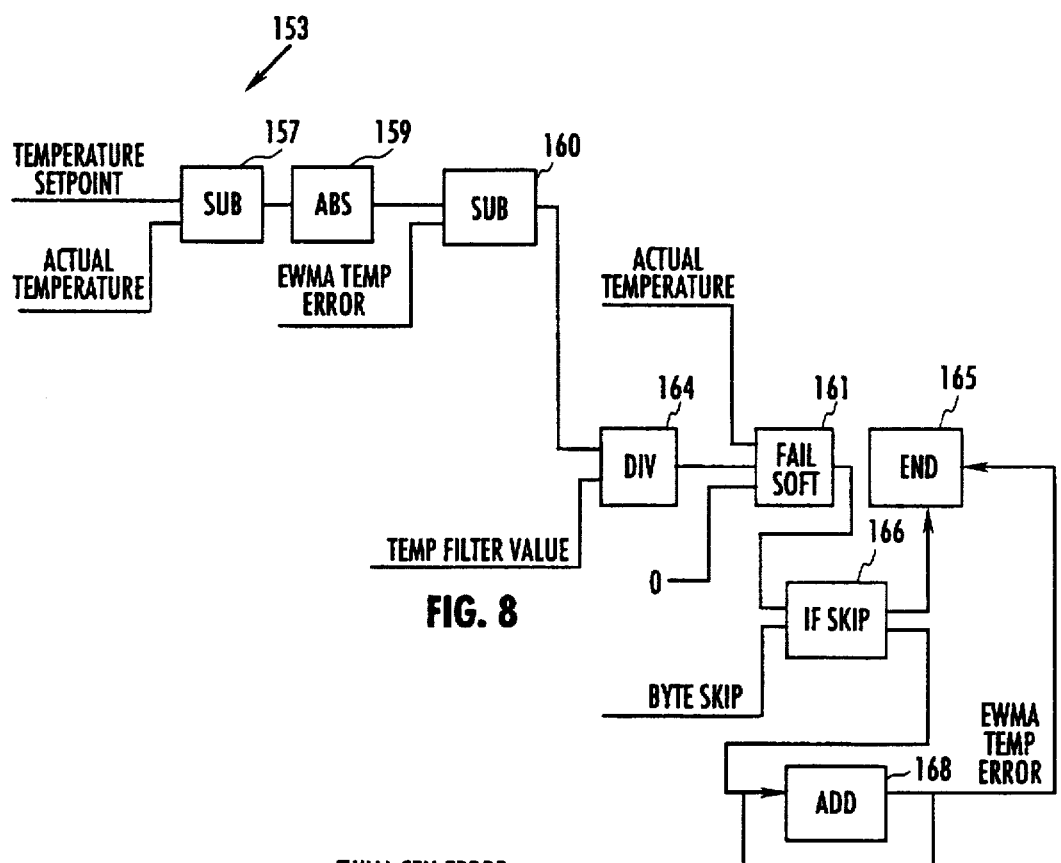
FIG. 8 is a block diagram illustrating the calculation of a performance index such as the EWMA of temperature error data for the controller shown in FIG. 3.
Figure 9:
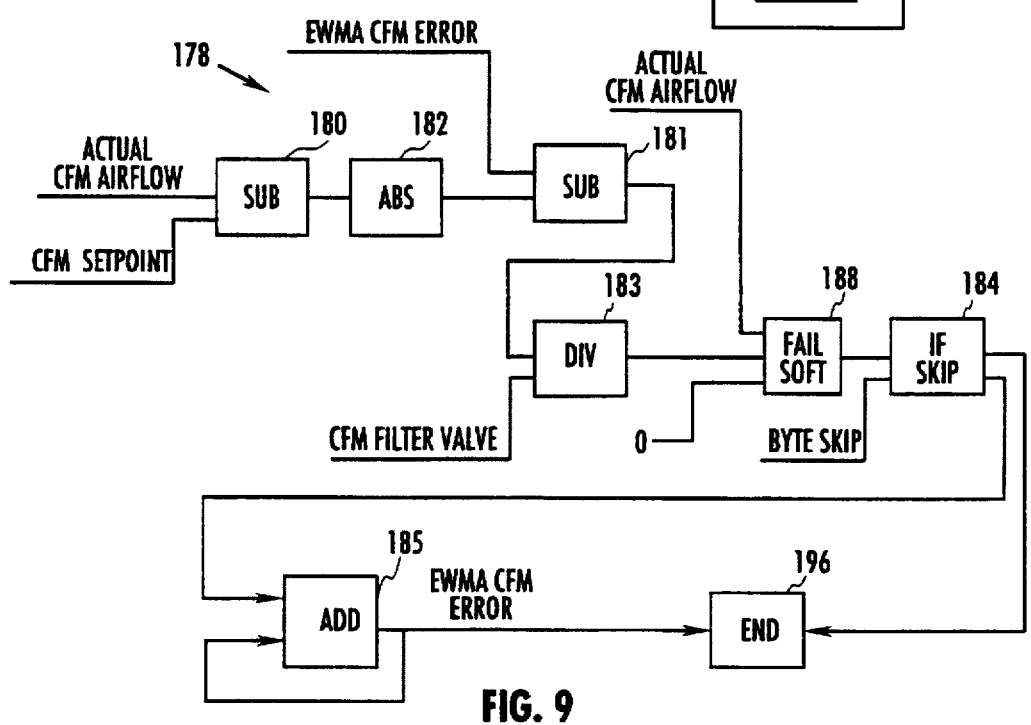
FIG. 9 is a block diagram illustrating the calculation of a performance index such as the EWMA of CFM error data for the controller shown in FIG. 3.

With reference to FIGS. 7–9, occupied run time is the amount of time that internal environment 66 associated with controller 20 is occupied and not in a shut-down mode. Controller 20 can include an "unoccupied" mode and an "occupied" mode. In the unoccupied mode, control of temperature and air flow in internal environment 66 is relaxed. Relaxing the control of internal environment 66 saves energy as unoccupied rooms and hallways are not heated, cooled or otherwise controlled. Therefore, the summary data, performance indices and EWMA values are not altered if the controller 20 is in an unoccupied mode as explained with reference to FIGS. 7–9.

With reference to FIG. 7, controller 20 is programmed to operate as an occupied run time circuit 148 which generates occupied run time data. A sense circuit 150 determines if controller 20 is in an occupied mode or a shut-down mode (an OR circuit 149 and sense circuit 150). If controller 20 is in an occupied mode, an adder 152 reads the occupied run time data in locations 104, adds the value 1.5 seconds (0.00041667 hours) to the occupied run time data and stores the sum in locations 104 of memory 102. If sense circuit 150 determines that controller 20 is in the unoccupied or shut down mode, the addition by adder 152 is skipped and a BYTE SKIP is produced at output 151. Sense circuit 150 determines whether controller 20 is in the occupied mode every cycle of the PID algorithm so that an accurate accumulation of the occupied run time data is stored in locations 104 of memory 102.

With reference to FIG. 8, controller 20 is programmed to operate as circuit 153 which generates the EWMA of temperature error. A subtractor 157 subtracts the actual temperature value from the setpoint temperature value. The actual temperature value is generated from the temperature signal provided at temperature control input 54. The setpoint temperature value may be programmed in the PID algorithm or otherwise set by the occupant or service person on thermostat 204.

An absolute value circuit 159 takes the absolute value of the difference between the actual temperature value and the setpoint value. A subtractor 160 provides the difference between the absolute value and the stored EWMA of temperature error ($|\overline{X_{-1}}|$ in Equation 3). The stored EWMA was calculated in the previous cycle of the PID algorithm. A divider 164 divides the difference by a temperature filter value ($1/\gamma$ in Equation 3). A fail soft circuit 161 supplies a zero to block 168 if the actual temperature sensor 50 should malfunction, thus preserving a more accurate performance index. Fail soft circuit 161 determines if sensor 50 is malfunctioning by analyzing actual temperature value provided by sensor 50. If the actual temperature value is abnormal such as zero or infinite, circuit 161 provides a zero to adder 168 if sensor 50 is malfunctioning. Otherwise, circuit 161 provides the quotient from divider 164 to circuit 168. Next, if the BYTE SKIP is not present (a circuit 166), adder 168 adds the stored EWMA of temperature error stored in locations 104 of memory 102 with value from circuit 101 (e.g., the quotient from divider 164 if sensor is not malfunctioning), thereby calculating the new EWMA of temperature error in accordance with Equation 3. Adder 168 stores the new EWMA of temperature error as the stored EWMA in locations 104 of memory 102 and advances to an end 165. If the BYTE SKIP is present, processor 100 skips adder 168 and advances from divider 164 to end 165. Circuit 153 may also include a circuit (not shown) for providing either a cooling temperature setpoint or heating temperature setpoint, depending on the mode of VAV box 38.

Preferably, the EWMA of temperature error for controller 20 is below 2° F. System parameters in network 10 may require different temperature error thresholds. For example, particular environments may require temperature errors less than 0.5° F. or less than 5° F. Ninety-five percent of all controllers such as controller 20 in network 10 should have an EWMA of temperature error data below 2° F. if a typical network 10 is operating properly. EWMA of temperature error data above 2° F. indicates errors associated with the tuning parameters of the PID algorithm, ductwork, temperature sensor 50, or other errors in network 10.

With reference to FIG. 9, controller 20 is programmed to operate as circuit 178 which generates the EWMA of CFM error data. A subtractor 180 receives the CFM air flow value at air flow input 56. The CFM supply setpoint is provided by the PID algorithm. Subtractor 180 subtracts the actual CFM air flow value from the CFM supply setpoint. Absolute value circuit 182 calculates the absolute value of the difference of the actual CFM air flow value and the CFM air flow supply setpoint. A subtractor 181 provides the difference between the stored EWMA of CFM error and the absolute value. The difference is divided by the CFM filter value ($1/\gamma$ in Equation 2) in a divider 183. The fail soft circuit 188 supplies a zero to block 185 if sensor 52 is malfunctioning, thus preserving a more accurate performance index. Circuit 188 operates similarly to circuit 161 (FIG. 8).

If the BYTE SKIP is not present (a circuit 184), an adder 185 calculates the new EWMA of CFM error by reading the stored EWMA of CFM error from locations 104 and adding the value from circuit 188 (e.g., the quotient from divider 183 if sensor 52 is operating properly). Adder 185 also stores the new EWMA of CFM error as the stored EWMA of CFM error in locations 104. If the BYTE SKIP is present, processor 100 skips adder 185 and advances to an end 196. Large CFM errors may be indicative of an error in sensor 52, tuning parameters of the PID algorithm, or fan and ductwork malfunctions.

Workstation 12 receives the performance indices discussed with reference to FIGS. 8 and 9. Workstation 12 obtains the performance indices by sending a command to read the EWMA values stored in locations 104 of memory 102. Workstation 12 writes the indices to a hard disk drive (not shown) associated with workstation 12 (FIG. 1). Alternatively, a portable computer can be coupled to bus 17 or 32 to receive the performance indices.

Preferably, controllers 20 have built-in systems for checking if sensor 50 or 52 is not connected or otherwise malfunctioning. If controller 20 detects that sensors 52 or 56 are not functioning properly, controller 20 issues a sensor failure warning and does not update the EWMA values during that time period. This feature prevents the EWMA values from being affected by improperly operating sensors 50 and 52.

Any of the EWMA values as may be compared to threshold limits to determine whether controller 20 of VAV box 38 is operating properly. Controller 20 may automatically compare the EWMA value to a threshold and provide a fault message to workstation 12 if that value is outside of the control limits. Also, the EWMA values from other controllers 20 may be compared to determine the precision among several controllers 20.

Figure 10:
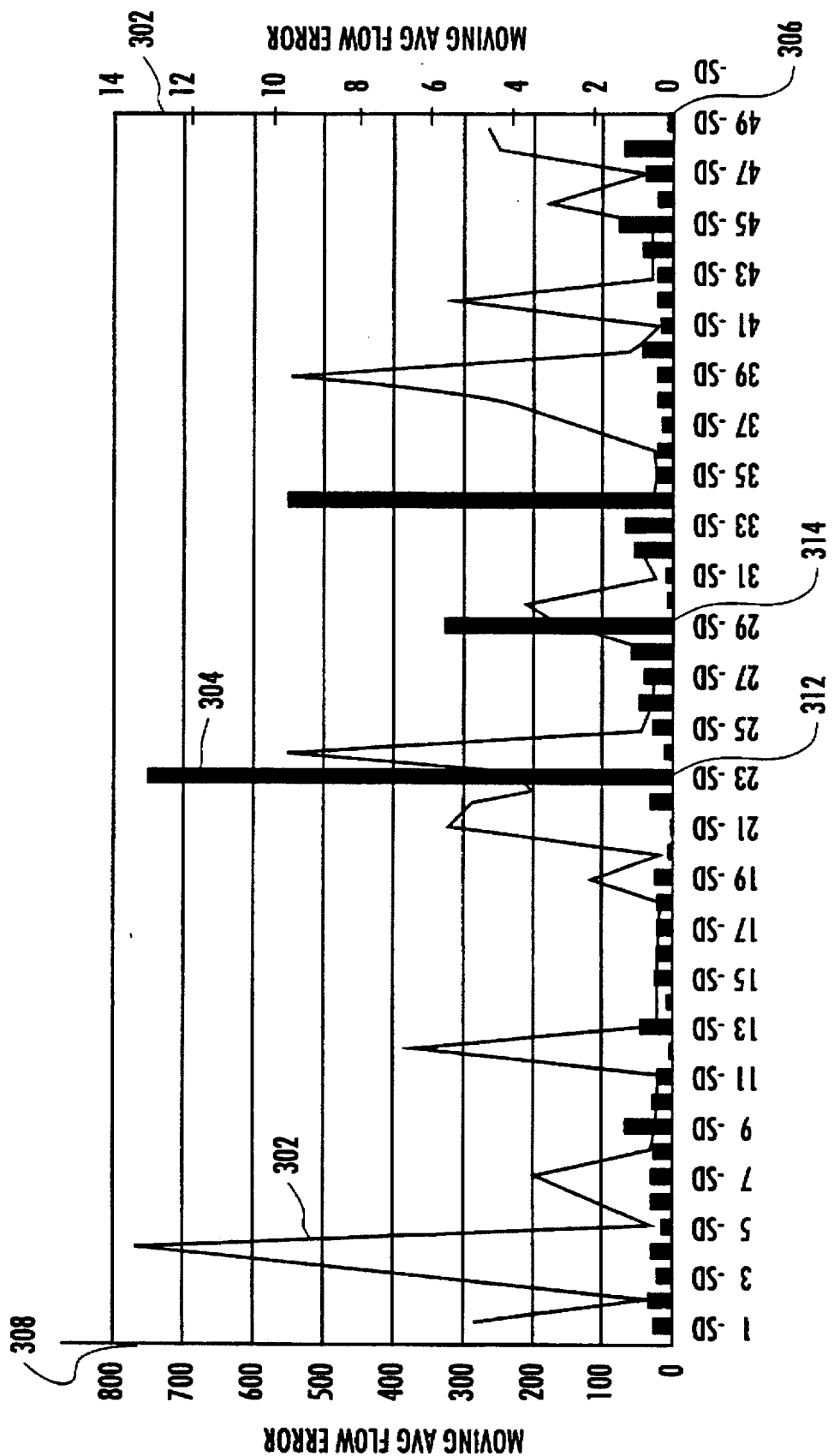
FIG. 10 is a graph of EWMA absolute value temperature error calculated according to the control diagram illustrated in FIG. 8 and EWMA of air flow error calculated according to the control diagram illustrated in FIG. 9.

An operator may advantageously view graphs related to combinations of the performance indices on workstation 12 as shown in FIG. 10. FIG. 10 shows the EWMA of air flow error and EWMA of temperature error plotted in the same graph. The EWMA of air flow error 304 is plotted in bar graph form, and the EWMA of temperature error 302 is plotted in line graph form. The EWMA of errors 302 and 304 are plotted for each VAV box 38 in network 10 across an axis 306. An axis 308 represents the EWMA of air flow error in CFM (normalized), and an axis 310 represents EWMA of temperature error in °F. Axis 306 shows addresses of various VAV boxes 38. VAV boxes 38, which have a high EWMA for both air flow error and temperature error such as at an address 312 and an address 314 of axis 306, indicate VAV boxes 38 which are not operating properly. Such VAV boxes 38 indicate that controller 20 or other part of VAV box 38 may need maintenance or adjustment.

Thus, the generation of indices discussed with reference to FIGS. 1–10 allows an operator to identify controllers 20 which are unable to control internal environment 66 within certain parameters such as a 3% duty cycle, a 2° F. temperature error, or a 12% CFM error. By periodically analyzing the EWMA values of indices, the operator may be able to identify gradual degrading mechanical performance over the life of network 10.

Preferably, controller 20 is configured by a controller executed software. Exemplary controller executed software in pseudo-code is provided in FIGS. 11A–H and J–L and configures controller 20 for the operations discussed with reference to FIGS. 4 and 8–10. The software may be implemented in assembly language, c language or other computer languages and run on processor 100 such as an 80C652 microcontroller to perform basic data collection operations, index calculations, and EWMA functions for network 10. Alternatively, a hardware control circuit, or other software may be utilized to collect and store data received by controller 20 and communicate the data to workstation 12.

It is understood that, while the detailed drawings and specific examples given describe a preferred exemplary embodiment of the present invention, they are for the purpose of illustration only. The invention is not limited to the precise details and conditions disclosed. For example, although a particular environment control network is discussed, other control systems may be utilized for other applications such as boilers, chemical process, manufacturing process, or other uses. Also, although particular facility management systems and components are suggested, the performance monitor system may be configured for various other HVAC systems. The system may easily be configured to analyze other parameters. Also, single lines in the various Figures may represent multiple conductors. Various changes may be made to the details disclosed without departing from the spirit of the invention which is defined by the following claims.

We claim:

1. In an environment control network, the network including a computer, and a plurality of units for controlling a process, each of said units including an appliance for controlling a portion of said process, each of said plurality of units operatively associated with a controller, each of said controllers comprising:

an appliance output coupled to said appliance, said appliance output providing an appliance signal for controlling said appliance;

a communication port;

a memory;

a processor coupled with said memory, said appliance output, and said communication port, said processor cyclically providing said appliance signal to control said appliance, said processor programmed to calculate and store weighted average data in said memory related to said appliance signal, wherein the computer is coupled to the communication port and the processor provides the weighted average data to said computer via the communication port in response to a summary command from said computer.

2. The controller of claim 1 further comprising a parameter input coupled with said processor, said processor programmed to receive a parameter value at said parameter input from an environment or other sensor, generate and store an exponentially weighted moving average parameter data related to said parameter value.

3. The controller of claim 2 wherein said parameter value is a humidity value, pressure value, temperature value or an air flow value.

4. The controller of claim 1 wherein said average data includes a duty cycle value of said appliance.

5. The controller of claim 2 wherein said parameter value is further comprised of a temperature value and an air flow value.

6. The controller of claim 1 wherein said communication port is coupled to the computer via a communication bus.

7. In a control network including a plurality of individual controllers, the controllers being coupled together on a communication link, the communication link being coupled to a computer, the controllers cooperating to control a process, a method of generating a performance index for monitoring performance of the controllers, the method comprising steps of:

periodically sampling a parameter related to said process with each of said plurality of controllers, wherein said parameter is received from a sensor;

generating a new time weight average of said parameter in accordance with said parameter and a stored time weight average of said parameter, said stored time weight average being a function of the previous values of said parameter, said new time weight average being said performance index;

storing said new time weight average of said parameter as said stored time weight average; and transmitting the stored time weight average to the computer in response to a command from the computer.

8. The method of claim 7, wherein said parameter is related to a parameter error, the parameter error is a different of a parameter setpoint value and an actual parameter value.

9. The method of claim 7, wherein said parameter value is related to air flow or temperature.

10. The method of claim 8, wherein said parameter value is comprised of a value related to temperature and a value related to said air flow.

11. The method of claim 7, wherein the new time weight average is stored in the controllers, and further comprising a step of providing the new time weight average to said communication link.

12. The method of claim 7, wherein said parameter value is related to an output signal from the controllers.

13. In an environment control network including a computer, and a plurality of units, each of said units providing air flow to an environment, each of said plurality of units operatively associated with a controller, each of said controllers being operatively coupled to said computer via a communication bus, each said controller comprising:

an environment sensor for providing a parameter value related to said environment;

a communication port coupled to the computer;

a memory; and a processor coupled with said memory and said environment sensor, said processor programmed to receive said parameter value from said environment sensor, generate an exponentially weighted moving average index related to said parameter value, and store said index in said memory, wherein a processor provides said exponentially weighted moving average index to said computer via said communication port.

14. The controller of claim 13 wherein said parameter value is related to temperature or air flow.

15. A VAV controller operatively associated with a VAV box, said VAV controller coupled to a first communication bus, said VAV controller comprising:

parameter input means for receiving a parameter value from a sensor;

a communication port coupled with said first communication bus;

memory means for storing diagnostic information; and processor means coupled with said memory means, said parameter input means, and said communication port, for generating said diagnostic information and receiving said parameter value, and said processor means programmed to receive said parameter value at said parameter input, said processor means programmed to generate said diagnostic information, said diagnostic information being related to an exponentially weighted moving average error associated with said parameter value, said processor means programmed to provide said diagnostic information to said communication port, wherein a computer is responsive to the diagnostic information provided to said communication port via said first communication bus.

16. A VAV controller operatively associated with a VAV box, said VAV controller coupled to a first communication bus, said VAV controller for use in a system including a station coupled with said first communication bus, a second communication bus coupled with said station and a portable computer couplable to said second communication bus, said VAV controller comprising:

parameter input means for receiving a parameter value from a sensor;

a communication port coupled with said first communication bus;

memory means for storing diagnostic information; and processor means coupled with said memory means, said parameter input means, and said communication port, for generating said diagnostic information and receiving said parameter value, and said processor means receiving said parameter value at said parameter input, said processor means programmed to generate said diagnostic information, said diagnostic information being related to an exponentially weighted moving average error associated with said parameter value, said processor means providing said diagnostic information to said communication port, said communication port providing said diagnostic information to said first communication bus, said first communication bus providing the diagnostic information to said station, said station providing the diagnostic information to said second communication bus, said portable computer receiving said diagnostic information from said second communication bus.

17. The VAV controller of claim 15 wherein the computer is a work station.

18. The VAV controller of claim 15 wherein said diagnostic information includes moving average temperature error data.

19. The VAV controller of claim 16 wherein said portable computer is programmed to display said diagnostic information.

20. The VAV controller of claim 15 wherein said controller provides an actuator signal to said VAV box for controlling air flow, and wherein said diagnostic information further is comprised of a plurality of samples of said actuator signal.

* * * * *

UNITED STATES PATENT AND TRADEMARK OFFICE
CERTIFICATE OF CORRECTION

PATENT NO.  : 5,682,329
DATED       : October 28, 1997
INVENTOR(S) : John Seem et al.

It is certified that error appears in the above-identified patent and that said Letters Patent is hereby corrected as shown below:

On the Title Page, under "Other Publications", line 2,
    "Expontially" should be --Exponentially--.

Column 13, line 21, claim 8,
    "a different of" should be --the difference between--.

Signed and Sealed this

Twenty-fourth Day of February, 1998

Attest:

BRUCE LEHMAN

*Attesting Officer*      *Commissioner of Patents and Trademarks*